United States Patent [19]

McCay et al.

[11] Patent Number: 4,464,841

[45] Date of Patent: Aug. 14, 1984

[54] DIMENSION BOARD FOR CUTSIZE PAPER

[75] Inventors: Johnny A. McCay, Hartselle; Arthur H. Owens; Fred N. Jackson, both of Florence, all of Ala.

[73] Assignee: Champion International Corporation, Stamford, Conn.

[21] Appl. No.: 374,993

[22] Filed: May 5, 1982

[51] Int. Cl.³ .............................................. G01B 5/16
[52] U.S. Cl. .................................... 33/174 R; 33/1 BB
[58] Field of Search ............ 33/174 R, 174 M, 174 K, 33/430, 403, 479, 480, 475, 474, 476, 1 G, 1 AA, 168 R, 1 BB, 1 R, 429; 83/467, 468, 607–609

[56] References Cited

U.S. PATENT DOCUMENTS

| | | | |
|---|---|---|---|
| 1,441,440 | 1/1923 | Mackness | 33/168 R |
| 1,679,927 | 8/1928 | Bell et al. | 33/1 K |
| 1,801,197 | 4/1931 | Halvorsen et al. | 33/430 X |
| 1,906,371 | 5/1933 | Dreifuss | 33/430 X |
| 2,089,272 | 8/1937 | Lake et al. | 33/174 R |
| 2,304,262 | 12/1942 | Lund | 83/468 |
| 3,760,506 | 9/1973 | Tudberry | 33/1 BB X |

FOREIGN PATENT DOCUMENTS 754450 8/1956 United Kingdom ............. 33/174 R

Primary Examiner—Harry N. Haroian
Attorney, Agent, or Firm—Evelyn M. Sommer; William W. Jones

[57] ABSTRACT

A dimension board for gauging the dimensions of cutsize paper with holes includes a generally planar measurement surface, first and second guides attached to the measurement surface and having respective first and second abutment surfaces intersecting the measurement surface along respective, perpendicular, first and second lines of intersection. A plurality of sets of gauge lines may be disposed along the first line of intersection beyond the first guide, along the second line of intersection beyond the second guide, and at the intersection of a pair of lines extending parallel to the first and second lines of intersection but separated therefrom by the desired dimensions of the sheet of paper, whereby when the sheet of paper is placed in abutment with the first and second abutment surfaces, the dimensions of the sheet of paper can be checked against the sets of gauge lines. Also included are further sets of gauge lines on the measurement surface corresponding to the approximate location of the drill holes on the sheet of paper, whereby the location of the drill holes on the sheet may be determined as well.

4 Claims, 1 Drawing Figure

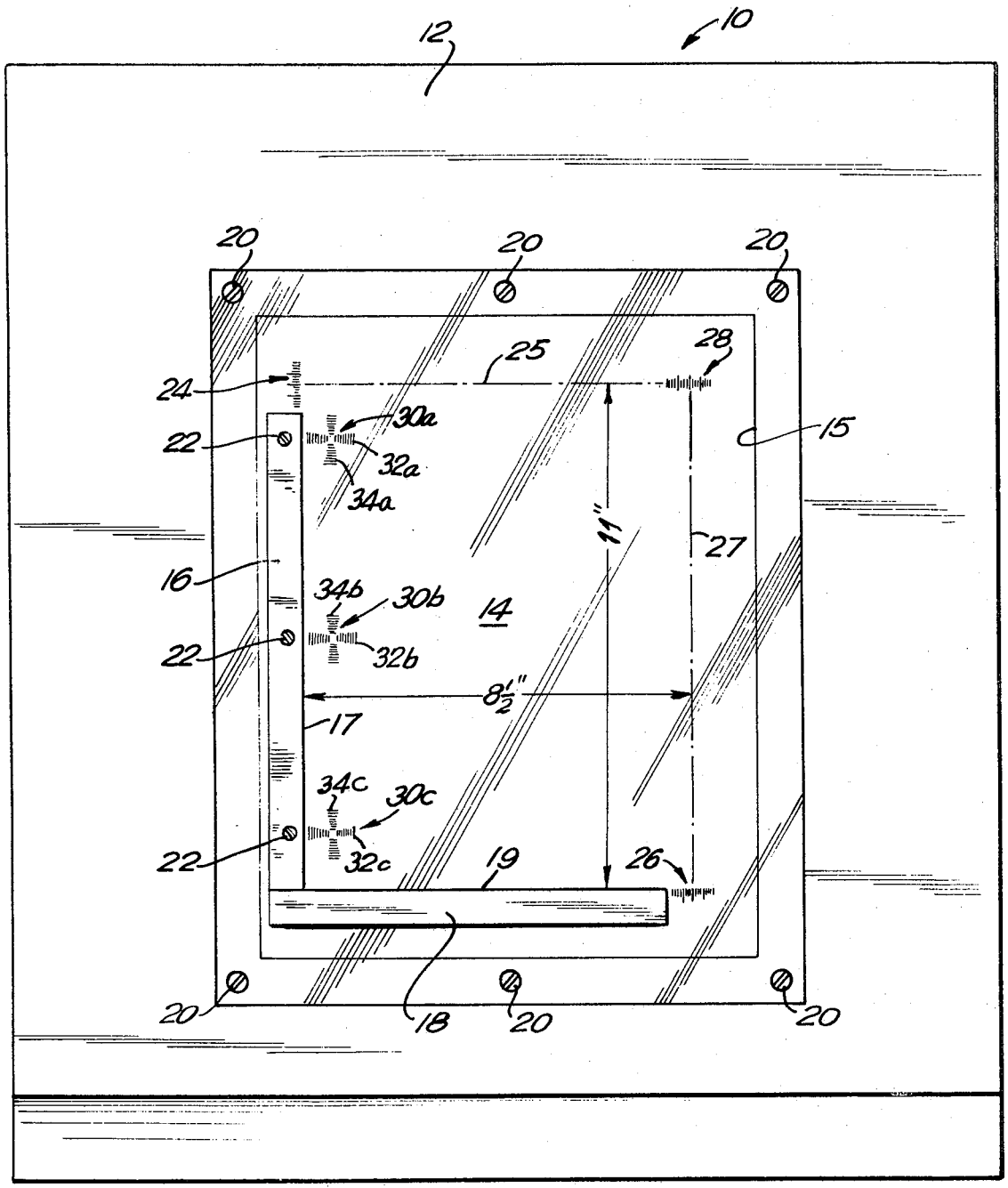

DIMENSION BOARD FOR CUTSIZE PAPER

BACKGROUND OF THE INVENTION

The present invention is directed to the field of gauges employed to measure the dimensions of paper, and more specifically to a gauge for determining the dimensions, squareness and hole positions of three-hole cutsize paper.

It is well known that an important consequence of the sorption and desorption of water by paper is the change in dimension that usually accompanies changes in moisture content. The dimensionl changes originate in the swelling and contraction of the individual fibers. It has been observed that cellulosic fibers swell in diameter from approximately 15–20% in passing from the dry state to the fiber saturation point. The precise degree of swelling is impossible to predict since the paper making fibers differ considerably in this property, and because of the irregular cross-section of fibers. Even though the swelling of the fiber is caused of the expansion and contraction of the paper, there is no direct relationship between the two phenomena. Paper samples made from the same fiber and having the same fiber swelling charcteristics may exhibit a wide variety of dimensional changes, depending on conditions of stock preparation and sheet forming and drying.

The above-described changes in dimension may seriously affect register in the cutting process employed in producing cutsize paper, resulting in improper size or lack of squareness, and if the cutsize paper is of the three-hole variety, the holes drilled therein may not be provided in the proper locations in the final product.

Although commercial equipment exists which can determine cutsize paper dimensions, squareness and proper hole disposition, the prior art equipment is expensive and requires a slow, elaborate procedure and specialized operator training.

OBJECTS AND SUMMARY OF THE INVENTION

It is therefore an object of the invention to provide a device for determining squareness and proper hole disposition in cutsize paper which is simple, quick and efficient.

It is a further object to provide a dimension board for cutsize paper which allows a quick and simple determination of squareness and proper hole disposition in cutsize paper.

In accordance with the invention, apparatus for gauging the dimensions of a piece of paper comprises a generally planar measurement surface, first and second guides, and a first and second set of gauge lines. The first guide is attached to the measurement surface and has a first abutment surface intersecting the measurement surface along a first line of intersection. The second guide is also attached to the measurement surface and has a second abutment surface intersecting the measurement surface along a second line of intersection perpendicular to the first line of intersection. The first set of gauge lines is substantially disposed along the first line of intersection beyond the first guide. The first set of gauge lines includes a first centerline disposed a first predetermined distance from the second line of intersection and a plurality of marks on both sides of the first center line. The second set of gauge lines are substantially disposed along the second line of intersection beyond the second guide and comprise a second centerline disposed a second predetermined distance from the first line of intersection and a plurality of marks on both sides of the center line.

The first and second predetermined distances correspond to the approximate desired dimensions of the piece of paper, whereby when the piece of paper is placed in abutment with the first and second abutment surfaces, the dimensions of the piece of paper may be checked against the first and second set of gauge lines.

The invention may further include a third set of gauge lines having a center point at the intersection of (i) a third line substantially extending through the first centerline and substantially parallel to the second line of intersection, and (ii) a fourth line substantially extending through the second centerline and substantially parallel to the first line of intersection. The third set of gauge lines may include a plurality of marks on both sides of the center point and extending along at least one of the third and fourth lines. Preferably, the marks in the third set of gauge lines extend along the third line.

The invention may further include at least one fourth set of gauge lines disposed predetermined distances from the first and second lines of intersection corresponding to the approximate distances of at least one drill hole in the piece of paper from the edges thereof. The at least one fourth set of gauge lines may include a center point corresponding to the center of the fourth set of gauge lines, and two sets of marks relatively disposed at right angles, each set of marks disposed on both sides of the center point. Usually, three of the fourth sets of gauge lines will be provided.

In accordance with the preferred embodiments, all of the pluralities and sets of marks are silk screened onto the measurement surface, and each of the marks in the pluralities and sets of marks are separated from adjacent marks within each plurality and set by approximately 1/32 inch. The measurement surface may be comprised of plexiglass methyl acrylate plastic, and the first and second guides may comprise aluminum bars.

BRIEF DESCRIPTION OF THE DRAWING

These and other objects and aspects of the invention will be described in more detail with reference to the sole drawing FIGURE which is a plan illustration of one example of the dimension board for cutsize paper which allows the above described determination of squareness and proper hole disposition in three-hole cutsize paper.

DETAILED DESCRIPTION OF THE INVENTION

With reference to the sole FIGURE, the dimension board 10 comprises a substantially flat frame 12, plexiglass methyl arcylate plastic measurement surface 14 and vertical and horizontal guide bars 16 and 18, respectively, both of which are mounted on the plexiglass methyl acrylate plastic measurement surface 14. The measurement surface 14 is fixedly secured to the frame 12 over a rectangular hole 15 in the frame by means of screws 20, or by any other convenient means. The vertical guide bar 16, having abutment surface 17, is mounted on the measurement surface 14 by means of screws 22. The vertical guide bar is in the form of a long rectangle vertically mounted as illustrated in the FIGURE. Mounted at the bottom of the vertical guide bar 16 is the horizontal guide bar 18, having abutment surface 19, and which is also formed as a long rectangle horizontally mounted perpendicular to the vertical guide bar 16. Although not shown, the horizontal guide bar 18 may also be mounted on the measurement surface 14 by means of screws, or alternatively, either of the guide bars 16 or 18 may be mounted on the measurement surface by any other convenient means, such as an adhesive, and the like.

Disposed along a first line of intersection of the abutment surface 17 and the measurement surface 14 is a set of top left gauge lines 24 having a center line which is disposed vertically from the abutment surface 19 of the horizontal guide bar 18 by whatever is the expected length of the cutsize paper, i.e., eleven inches. The top left gauge lines should be provided in 1/32 inch intervals and should extend approximately ¼ inch on either side of the center line.

Similarly provided along a second line of intersection between abutment surface 19 and the measurement surface 14 are bottom right gauge lines 26 having a center line disposed horizontally from abutment surface 17 of the vertical guide bar 16 by whatever is the expected width of the cutsize paper, i.e. 8½ inches. As with the top left gauge lines 24, the bottom right gauge lines are provided in 1/32 inch intervals and extend on either side of the center line by ¼ inch.

Disposed at the intersection of (i) a third, horizontal line 25 extending from the center line of the top left gauge lines 24 and (ii) a fourth, vertical line 27, extending from the center line of the bottom right gauge lines 26, is a center point for the top right gauge lines 28 which extend along the third, horizontal line 25 on either side of the center point for approximately ¼ inch at 1/32 inch intervals. The top right gauge lines may alternatively be disposed along the fourth, vertical line, rather than the horizontal line, or along both lines, if desired.

Finally, a plurality of sets of hole gauge lines 30a–30c having both horizontal and vertical centerlines, are provided along the vertical guide bar 16 at predetermined locations depending upon the desired position of the drilled holes in the cutsize paper. In the above example of standard 8½×11 cutsize paper, the vertical center lines of each of the sets of hole gauge lines 30a–30c are disposed 0.375 inches horiontally from the abutment surface 17 of vertical guide bar 16 and each of the horizontal centerlines are separated by 4.25 inches vertically, the horizontal centerline of hole gauge line set 30a being disposed below the third horizontal line 25 by 1.25 inches, the horizontal centerline of the hole gauge line set 30c being disposed 1.25 inches vertically from the abutment surface 19 of horizontal guide bar 18. As will be appreciated by those skilled in the art, other dimensions may readily be employed for any particular paper size and hole disposition.

The three sets of hole gauge lines 30a–30c each comprise horizontal and vertical hole gauge lines 32a–32c and 34a–34c, respectively, each disposed at 1/32 inch intervals, and extending ¼ inch on either side of, and above and below the vertical and horizontal center lines, respectively. The horizontal hole gauge lines 32a–32c become shorter vertically as they get closer to the vertical center line, and the vertical hole gauge line 34a–34c become shorter as they get closer to their respective horizontal center lines, such that the horizontal and vertical hole gauge lines do not overlap.

The frame 12 is preferably constructed of No. 1 grade plywood and may be varnished and shellacked to the desired finish. The measurement surface 14 is preferably plexiglass methyl acrylate plastic, approximately ⅜ of an inch thick and colored as desired. The vertical and horizontal guide bars 16 and 18 may be made of aluminum, and are preferably about ¾ of an inch wide and approximately ⅛ of an inch thick. The top left, top right, bottom right and hole gauge line sets may be engraved in silk screen on approximately 0.03125 inch thick material.

In operation, three-hole cutsize paper may be placed in abutment with the abutment surfaces of the vertical and the horizontal guide bars 16 and 18 so as to place the top left, top right and bottom right corners of the cutsize paper in registry with the top left, top right and bottom right gauge line sets 24, 28 and 26, respectively. Further, any drilled holes provided in the paper are also in approximate alignment with the hole gauge lines sets 30a–30c. The operator may then quickly and easily determine whether the paper is of the proper dimensions, is out of square, and is provided with holes in the proper predetermined positions. By providing the gauge lines as described above, the operator may not only determine and detect whether one or more of the dimensions of the paper is improper, but can also quickly and easily determine by how much the particular dimension is in error. As will be appreciated by those skilled in the art, the operator can almost instantly determine and detect whether such conditions exist to within the tolerance provided by the gauge lines, 1/32 of an inch in the above example. Of course, higher tolerances can be achieved by providing a more densely packed set of gauge lines.

Although the invention has been described with reference to the specific embodiment, it is readily apparent that modifications, alterations, or changes may be made without departing from the spirit and scope of the invention as defined by the following claims.

What is claimed is:

1. A device for gauging the dimensions of a sheet of paper, said device comprising:
    (a) a planar support surface;
    (b) means on said support surface operable to form intersecting first and second abutment surfaces extending perpendicular to each other, said abutment surfaces being operable to engage adjacent edges of a sheet of paper to set the position of a sheet of paper on the support surface;
    (c) a first set of gauge lines disposed on said support surface, said first set of gauge lines including a first centerline elongated in the direction of said first abutment surface and spaced apart therefrom a first predetermined distance, and said first set of gauge lines further including a plurality of secondary lines elongated in the direction of said first abutment surface and disposed on both sides of said first centerline, said first predetermined distance being equal to a desired distance between a first pair of opposite edges of the sheet of paper;
    (d) a second set of gauge lines disposed on said support surface, said second set of gauge lines including a second centerline elongated in the direction of said second abutment surface and spaced apart therefrom a second predetermined distance, and said second set of gauge lines further including a plurality of secondary lines elongated in the direction of said second abutment surface and disposed on both sides of said second centerline, said second predetermined distance being equal to a desired distance between a second pair of opposite edges of the sheet of paper;

(e) a plurality of sets of hole gauge lines disposed in alignment and spaced apart from each other on said support surface, each set of said hole gauge lines comprising a first array of lines parallel to said first abutment surface and disposed on both sides of a center point, and a second array of lines parallel to said second abutment surface and disposed on both sides of said center point, said centerpoints being spaced apart from each other by distances equal to desired distances between centers of a row of holes formed in the sheet of paper;

(f) said first and second sets of gauge lines and said sets of hole gauge lines being displayed in a manner which clearly contrasts with any other material displayed on said support surface.

2. The device of claim 1 wherein said sets of hole gauge lines are disposed closely adjacent to one of said abutment surfaces.

3. The device of claim 1, wherein said lines in said first and second arrays of lines in each of said sets of hole gauge lines progressively increase in length as the distance from said centerpoints increases.

4. The device of claim 1, further comprising a third set of gauge lines disposed on said support surface diagonally opposite the point of intersection of said first and second abutment surfaces, said third set of gauge lines including a third centerline and a plurality of secondary lines disposed on both sides of said third centerline, said third centerline and secondary lines on both sides thereof being colinear with the centerline and secondary lines of one of said first and second sets of gauge lines.

* * * * *